Figure 1:
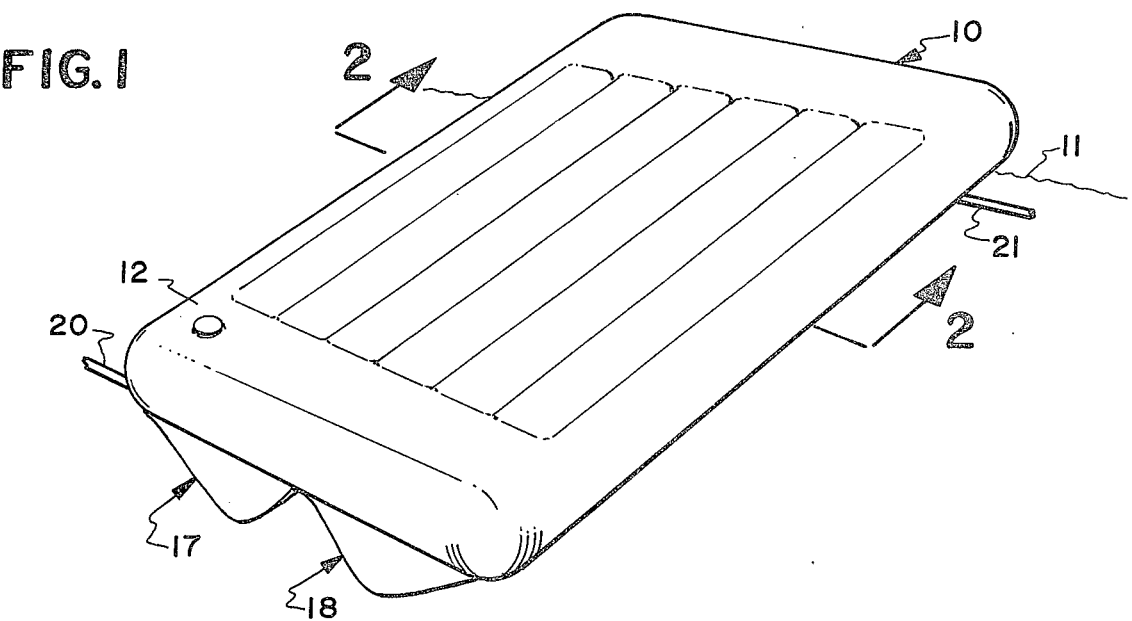

United States Patent [19]

Pelehach et al.

[11] 3,949,095
[45] Apr. 6, 1976

[54] SOLAR ENERGY POOL HEATING APPARATUS

[76] Inventors: Michael Pelehach, 22 Gina Drive, Centerport, N.Y. 11721; Robert W. Kress, 27 Mill Road, Lloyd Harbor; Rolf J. Larson, 36 Ryder Ave., Dix Hills, both of N.Y. 11746

[22] Filed: July 10, 1974

[21] Appl. No.: 487,047

[52] U.S. Cl. .................. 126/271; 237/1 A; 9/11 A
[51] Int. Cl.² ............................................ F24J 3/02
[58] Field of Search ........... 126/270, 271; 4/172.12, 4/172.13; 237/1 A; 9/2 A, 11 A

[56] References Cited
UNITED STATES PATENTS

| | | | |
|---|---|---|---|
| 2,370,069 | 2/1945 | Patten | 9/2 A |
| 2,390,199 | 12/1945 | Walsh | 9/11 A |
| 2,390,199 | 12/1945 | Walsh | 9/2 A |
| 3,072,920 | 1/1963 | Yellott | 126/271 |
| 3,453,666 | 7/1969 | Hedges | 126/271 |

*Primary Examiner*—John J. Camby
*Assistant Examiner*—Henry C. Yuen

[57] ABSTRACT

A solar heating device for swimming pools comprising an inflatable raft having a thermally reflective bottom surface and a thermally transparent top surface, and means for elevating at least a fraction of said reflective surface above the swimming pool surface during periods of diminished solar radiation to reduce heat loss from the water. One raft is generally small enough to be easily handled and a plurality of rafts may be required to cover a substantial part of the water surface. The number of rafts required is variable and provides a measure of flexibility to the rate of heating, i.e., by providing more rafts in spring and fall and perhaps none in mid-summer.

10 Claims, 10 Drawing Figures

SOLAR ENERGY POOL HEATING APPARATUS

This invention relates to heating means for confined bodies of water such as swimming pools and has particular reference to heating means using solar energy.

In order to explain the functioning of the invention, the fundamental thermodynamics of an unheated outdoor body of water will be reviewed briefly. During daylight hours, solar radiation heats the water at a high rate, even during winter. Heat loss occurs by three methods. During both day and night, heat is lost to the air by conduction. Evaporation, further aggravated by wind, also causes cooling of the water. Particularly at night, heat is re-radiated to space from the water. Examination of the relative magnitudes of the components of heat exchange shows that the dominant factors are the solar radiant heat input and night heat re-radiation loss. One can absorb the incoming solar radiation relatively efficiently but can do nothing to affect the amount of the incoming radiation which depends primarily on earth/sun geometry. Whether or not the temperature of the body of water will rise or fall, neglecting evaporation and secondary conduction of heat to the air for the moment, will depend largely on how much heat is re-radiated at night. Effective blockage of reradiation loss will cause a rapid pool temperature rise with respect to the normal temperature, even in winter. The present invention is an improved solar heating device with provision for blocking radiation heat loss automatically or manually.

The main component of this invention is, in part, an air cushion raft preferably of a size easily handled by one person. It may be approximately three feet by six feet and can be compared to the floats used for recreational purposes in swimming areas. The raft consists of two layers of plastic separated by an air pocket. One of the layers is covered on the outside by a highly heat reflective aluminized surface. On the inside, this same layer is covered by a dull black heat absorptive surface. The second plastic layer on the other side of the air pocket is transparent. When used for pool heating, the raft is floated on the surface of the pool, aluminized side down. Incoming solar radiation is transmitted essentially undimished through the transparent layer to the black layer where the heat is absorbed and conducted to the pool through water contact with the aluminized surface on the other side of the black layer.

The heating principle as described to this point has been used by other for similar applications. The swimming pool cover described in a U.S. Pat. No. 3,072,920 to John A. Yellott is a good example pf past practice, but prior art does not show the separate individual rafts which provide a measure of flexibility.

The major point of departure of the present invention from prior art lies in the provision of additional means of raising the aluminized surface above the water during periods when heat input to the water body is absent. If the aluminized surface is held out of water contact, heat will not be lost from the water by conduction through that aluminized surface, and any heat loss from the water by radiation is reflected back to the water. Such means for raising the aluminized surface may be automatic, semiautomatic or manual, as desired. In effect, an automatic "heat diode" has been created which absorbs radiant solar energy in daytimes but largely prevents heat re-radiation at night.

In one method and means, the raft is provided with secondary inflatable-deflatable air chambers under the aluminized surface, normally between the raft and the water surface. In the daytime i.e., during periods of substantial solar radiation the airchambers are deflated and the aluminized surface is in thermal conductive relationship with the water surface so that the water can be heated as described above. In the evening the airchambers are inflated, lifting the aluminized surface above the water surface to provide the thermal reflective surface above the water. The deflation-inflation sequence is accomplished by activating an air pump and exhaust mechanism at the proper time and may be controlled automatically with a photoelectric cell or a clock, or manually, as desired.

In other arrangement the raft is fitted with end airchambers which tend to bend when solar energy is absent. The end chamber is made with a transparent upper surface and a heat absorbing lower surface. The upper surface is longer than the lower surface so that when both surfaces are at equal temperatures the cushion assumes a "sausage" shape. When exposed to sunshine the lower surface absorbs heat energy and expands until the lower surface is the same length as the upper surface, i.e., the chamber is no longer bent up. It will be recognized that the raft will be forced to bend with the end chambers and it will assume an arcuate shape at night, lighting a major portion of the aluminized surface out of the water. In the daytime, the raft will lie flat.

In a third arrangement a strap of material with a high coefficient of thermal expansion is attached below the center line of the raft to the outside surfaces thereof. As solar radiation diminishes the strap contracts and bows the raft upward in the center. Thus, the aluminized surface is again raised out of contact with the water surface to prevent heat loss from the water body. When the temperature of the strap rises, the strap expands so that the raft is permitted to assume its flat condition and its thermally conductive relationship with the water.

It will be evident that the area of a single raft is only a small percentage of the area of the swimming pool's surface. Thus, for efficient heating, a number of rafts will be required to cover a substantial portion of the swimming pool. A pool of say eight hundred square feet will require about thirty rafts of the eighteen square feet size and will cover about seventy percent of the area of the pool. It is expected that such coverage will be sufficient to heat a pool although more might be required in the most northern latitudes in early spring and late fall. As the ambient temperature increases, the number of rafts can be diminished in order not to overheat the water. This flexibility provides some control over heating which may be further extended by turning the rafts over during extremely hot days. The aluminized surface being upward would reflect, rather than absorb, solar energy and keep the pool from overheating.

This invention results in installation and operating cost savings as well as energy savings by greatly reducing or eliminating the need for conventional outdoor swimming pool heating in northern or southern latitudes where it would normally be required. For example, in New York City, one or two months of annual additional pool utilization could be expected to result. It is estimated that for the New York area, pool heating from 45°F to 70°F can be accomplished during the month of April in as little as one week, or up to one month depending on the percentage of pool surface covered by the floating inflatable rafts. Following initial Spring heating at the chosen rate (determined by pool percent coverage), the desired temperature can be maintained by a lesser number of rafts. In California, all year round pool swimming could result, which is not possible without heating.

It will be seen then, that the present invention extends the useful period for enjoyment of residential pools. The rafts are relatively inexpensive, are conserving of other energy sources and have supplementary uses. For example:

a. Turned aluminized side up and arranged into a sort of "cubicle" open to solar radiation from above, an oven effect with concentrated reflection of solar rays can be created for sunbathing in even deepest winter in New York latitudes. This can be done with these rafts because they are of convenient size and easily handled;

b. The rafts are obviously useful for pool playing, floating and relaxation. Transparent side up, they continue to heat pool. Aluminized side up they heat the user providing warm, comfortable floating relaxation when desired; and c. The rafts can be stored against attic rafters, inflated aluminized side in, to result in effective winter insulation.

It is an object of the invention to provide an improved solar heating system for swimming pools.

It is another object to provide a solar heating system which can be easily handled by one individual.

It is another object of the invention to provide a solar heating system in which the degree of heating can be adjusted.

It is a particular object of this invention to provide a solar heating system in which heat loss from the pool during periods of diminished solar radiation is reduced.

These and other subjects will become clear in the description to follow.

Figure 2:
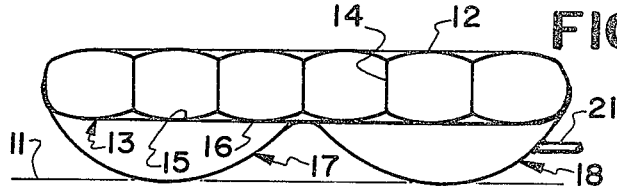
Figure 3:
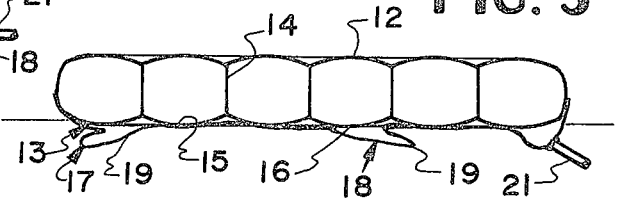
Figure 4B:
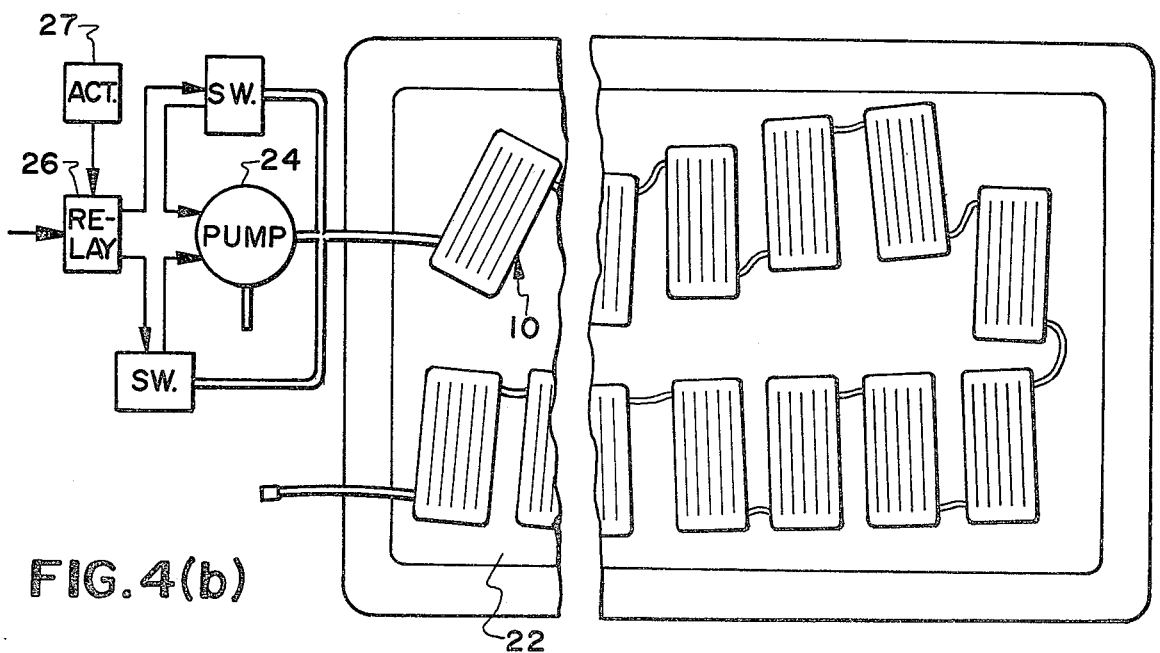
Figure 4A:
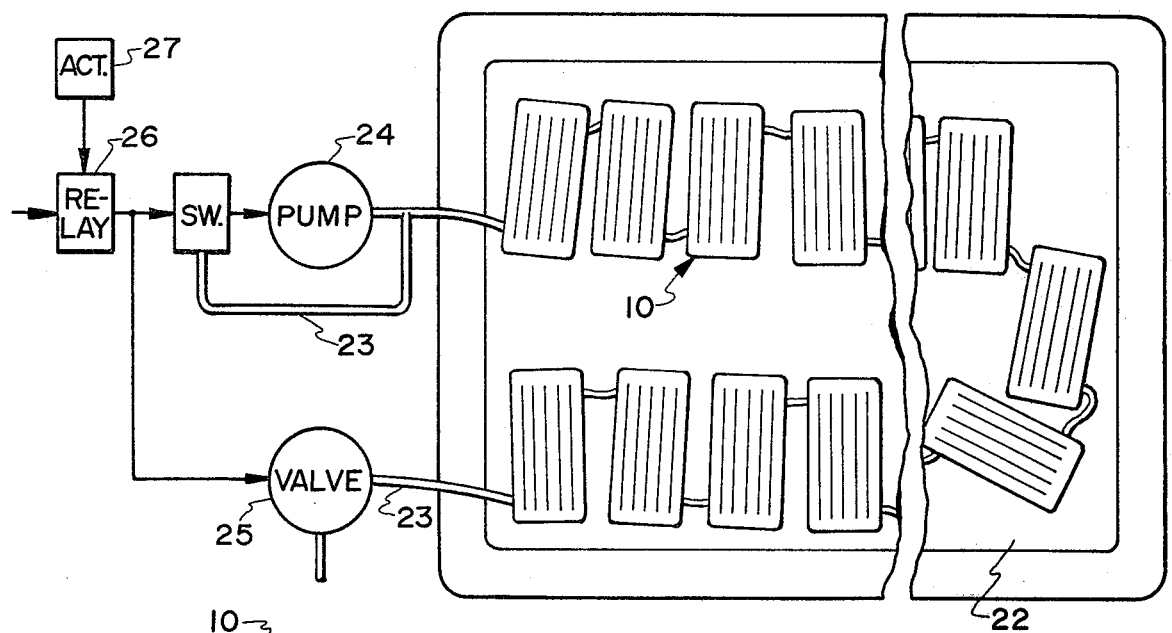
Figure 5:
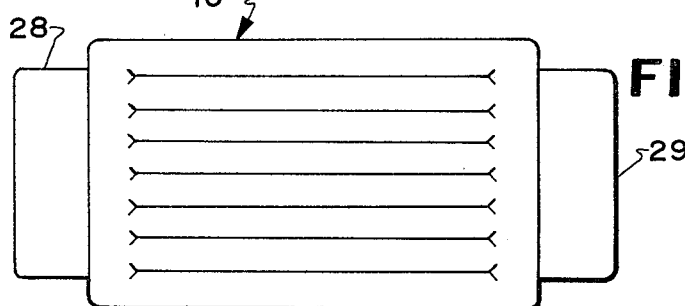
Figure 6A:
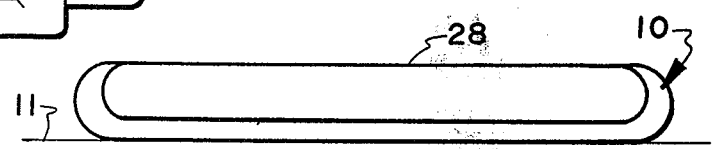
Figure 6B:
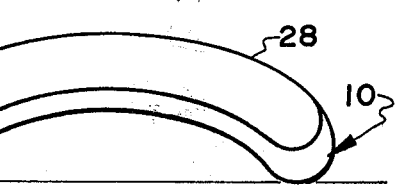
Figure 7A:
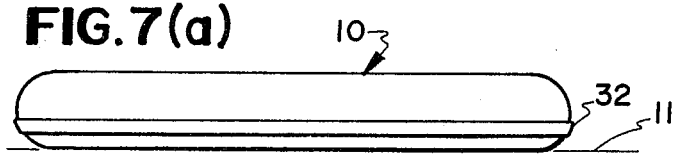
Figure 7B:
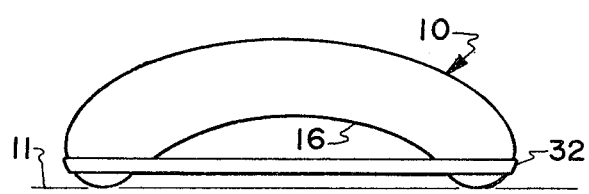

For a more complete understanding of this invention reference may be had to the accompanying diagrams, in which, FIG. 1 is a pictorial representation, partly in section, of the preferred embodiment of the heating raft of this invention, FIG. 2 is a cross sectional view of the raft in FIG. 1, FIG. 3 is a modification of FIG. 2, FIG. 4 (a) shows a plurality of rafts covering the surface of a swimming pool, FIG. 4 (b) shows a modification of a portion of FIG. 4 (a), FIG. 5 is another embodiment of the invention, FIG. 6 (a) is an end view of FIG. 5, with the raft in the day state, FIG. 6 (b) is an end view of FIG. 5, with the raft in the night state, FIG. 7 (a) is a modification of FIG. 5, with the raft in the day state, FIG. 7 (b) shows the modification of FIG. 7 (a) in the night state.

With reference now to FIGS. 1 and 2 a preferred embodiment of the solar heating raft 10 is shown in an elevated condition where the bottom of the raft 10 is raised above the surface of the water 11. The raft 10 comprises a top transparent layer 12 of pliable plastic material and a lower pliable plastic layer 13, which are sealed together around the periphery to form an airtight cushion. The top and bottom layers are connected by a plurality of ribs 14 to give the raft a flat rather than balloon shaped contour. The bottom layer 13 is made energy absorbent on the inside of the raft by providing it with a blackened coating 15. The exterior of the layer 13 is provided with a metalized coating, e.g., an aluminized coating 16 to make it energy reflecting. The exterior aluminized coating 16 is protected from contamination by a thin vinyl coating over the aluminum.

The term transparent as applied to the top layer 12 indicates that it does not attentuate the solar energy as it passes though the layer. Both layers 12 and 13 are good thermal conductors as well as being possessed of the other thermal characteristics enumerated above.

As shown in FIGS. 1 and 2, the raft 10 may be elevated by the pair of air chambers 17, 18 which are attached to the bottom layer 13 when the air chambers 17, 18 are inflated. In the heating condition, however, the raft 10 is lowered by deflating chambers 17, 18 as shown in FIG. 3 so that the layer 13 is in intimate thermal contact with the water 11. It is evident that the envelope 19 of the air chambers 17, 18 is interposed between the exterior surface 16 and the water 11. The envelope 19 is a good thermal conductor however, and being in intimate thermal contact with surface 16 it can be said that surface 16 is in thermal contact with the water 11.

Chambers 17, 18 and their function will be described more fully later on, but for the moment consider the heating condition wherein chambers 17, 18 are deflated as shown in FIG. 3 and the metalized layer 16 is in thermal conductive relationship with the water 11.

During hours of significant solar radiation, i.e., daytime hours, solar energy reaches the upper layer 12 of the raft 10 from the sun. The amount of solar energy reaching the cushion 10 is dependent on such things as time of the year, latitude of the location, cloud cover and so on. However, those are conditions over which the user has no control. The theoretical operation of the invention will not be inhibited by them although the effectiveness of the unattenuated. will vary with those and other environmental conditions such as wind, for example.

As described earlier, the top layer 12 is transparent to thermal energy and permits the solar energy to reach the bottom layer 13 virtually unattenuated. The blackened surface 15 absorbs the thermal energy which is then conducted through layer 13 to the metalized outer surface 16. When surface 16 is contact with the water the thermal energy is conducted through it to the water which in turn is heated thereby.

During periods of reduced solar energy inpat, e.g., nighttime hours or cold days, the heated water tends to radiate energy to the cooler air and thereby lose heat. To minimize that heat loss, and the heat which might be conducted through the raft 10 to be radiated to the air, the raft 10 is raised above the water surface (FIGS. 1, 2) so that the metalized layer 16 now acts to reflect heat radiated from the water back to the water and eliminates heat loss by conduction through the raft.

The preferred mechanism by which the raft 10 is raised and lowered includes the inflatable chambers 17, 18 which as stated earlier, are attached to the bottom layer 13. Chambers 17, 18 are not independent of each other, but air passages, not evident in the exterior views, interconnect the chambers 17, 18. Chamber 17 is provided with an air input connection 20 while chamber 18 is provided with an air outlet (or exhaust) connection 21. Two chambers 17, 18, attached to the periphery and to the center of raft 10, are used for purposes of stability in floating which might not be achieved with a single chamber. During the daytime the chambers 17, 18 are deflated and surface 16 is lowered into position for conducting energy to the water body, as explained earlier, through the walls 19 of chambers 17, 18 which are now collapsed and in intimate contact with surface 16. For even better thermal conductivity the chambers 17, 18 may be evacuated to remove any air which might prevent direct physical contact between surface 16 and the walls 19 of chambers 17, 18. The material of which envelope 19 of chambers 17, 18, is made is a good thermal conductor such as that used for the top surface 12 of raft 10.

When the chambers 17, 18 are inflated the cushion 10 rises and places the metalized surface 16 in position to reflect thermal energy.

FIG. 4 (a) shows a plurality of rafts 10 floating in and covering a large percentage of the surface of the pool 22. Rafts 10 are interconnected by tubing 23, one end of which leads to an air pump 24 the other end of which leads to a solenoid actuated exhaust valve 25. Pump 24 and solenoid valve 25 are automatically energized or de-energized through a relay 26 which is actuated by a photoelectric cell 27, so as start pump 24 and close valve 25 in the evening and to stop pump 24 and open valve 25 in the morning. A safety pressure switch 24 (a) deenergizes pump 24 when pressure in the rafts 10 reaches a predetermined value and controls pump 24 to maintain that pressure.

The cell 27 may be replaced by an electric clock switch if desired to actuate the pump and valve on a time, rather than daylight, schedule. Other components may be added as appropriate without departing from the basic motion of elevating the raft 10 in the evening and lowering raft 10 in the morning. For example, pump 24 may be reversible as illustrated in FIG. 4 (b), to provide a suction to remove the air from the chambers 17, 18 more rapidly, and to provide a vacuum for closer contact between the envelope 19 and metalized layer 16. In this instance the solenoid valve 25 is unnecessary and the last section of tube 23 is sealed off.

FIG. 5 shows a modification of FIG. 1 in which the lower chambers 17, 18 of FIG. 1 are replaced by special end chambers 28, 29. The end chambers 28, 29 are manufactured with a bow in the center and assume the arcuate "sausage" shape shown in FIG. 6 (b) during low solar radiation thermal condition to raise the center of the raft 10 out of the water 11. During the daytime, the sausage straightens out and the raft 10 lies flat in the water (FIG. 6 (a)).

Each end chamber, e.g., 28, is comprised of a transparent top layer 30 and an energy absorbent bottom layer 31. The bottom layer 31 is normally shorter than top layer 30 but as solar energy is absorbed by the layer 31 it heats up and expands and the bow in the chamber disappears. In the evening, the solar energy no longer heats the layer 31 and as it cools off it contracts and the chamber again assumes the arcuate shape and lifts the center of the raft 10 out of the water. The end chamber 28 preferably is not as thick as the raft proper in order that the bottom layer 31 of the chamber 28 does not touch the water surfaces. If the bottom layer touches the water, the thermal conditions might be such that the raft 10 would not be able to flatten out readily. The external bottom surface of each end cushion 28, 29 is preferably metalized to increase the area of the reflective surface which prevents heat loss from the pool. It will be understood that the degree of curvature is exaggerated in FIG. 6 (b). As long as the center of the raft is above the water surface by even a small amount, e.g., an inch or two, heat loss will be reduced.

FIG. 7 (a) shows the end view of a modification of FIG. 5, wherein the end chamber 28 is replaced by simple tension strap 32, having a high coefficient of thermal expansion. The ends of strap 32 are connected to the sides of the raft 10 and below the center line of raft 10. A similar strap is used on the opposite end of the raft 10. In the evening the straps are contracted so as to raise the center of the raft out of the water (FIG. 7 (b)), but in the daytime as the temperature rises the strap 32 and one on the opposite end of the raft 10 expand and permit the raft 10 to assume the flat configuration (FIG. 7(a)).

It will be seen that in the embodiment of FIGS. 5 and 7 (a) no auxiliary equipment or timers are required so that the conversion of the rafts 10 from a thermally conductive to reflective relationship with the water 11 is entirely automatic.

In another embodiment which merits discussion here, the raft 10 comprises a plurality of individual tubes joined together along their length. Although this embodiment is not separately illustrated, FIGS. 2 and 3 can be said to represent the cross section of such an arrangment of six separate tubes. Each tube in itself has the thermal properties of the raft 10, i.e., a thermally transparent top surface, a bottom surface with an internal heat absorblayer and an external heat reflecting layer. The aluminized exteriors surfaces of the tubes are protected against contamination by a thin vinyl sheet or coating stretched across their bottom surfaces.

Having described the preferred embodiment and several other embodiments of the invention, it should be clear that the invention contemplates providing a device which heats the pool during periods of substantial solar radiation with means heat diode"raising that device above the surface of the pool during periods of reduced solar radiation and with further means for reflecting radiated heat back to the pool while in that raised position. Thus a "heat diode" is created which permits heat to flow into the pool freely but which provides a restriction to heat flow out of the pool.

It will be evident that the invention may take many forms other than those described without departing from the spirit of the invention or from the spirit of the appended claims.

We claim:
1. An inflatable raft for heating a pool of water by solar energy,
said raft having a thermally transparent top surface and a bottom surface with a thermally reflective exterior,
configuration modifying means attached to said raft for selectively adjusting said raft to a first or second configuration under operating conditions such that in said first configuration said inflated raft floats on the water with the entire bottom surface in conductive thermal contact with said water and in said second configuration said raft floats on said water with at least a portion of said bottom surface raised above said water surface and out of thermal conductive contact but in thermal reflective relationship therewith.

2. The device of claim 1 wherein the bottom of said raft has a thermally absorbtive interior surface.

3. The device of claim 1 wherein the configuration modifying means includes inflatable chambers attached to the bottom of said raft said chambers being deflated when the raft is in the first configuration and said chambers being inflated when the raft is in the second configuration.

4. The device of claim 3 including pneumatic pumping means for inflating said chambers during periods of reduced solar radiation and automatic control means responsive to solar radiation for energizing said pumping means.

5. The device in claim 3 including reversible pumping means for alternately inflating and evacuating said chambers.

6. The device in claim 2 wherein said configuration modifying means includes means for arching said raft upward in the center whereby the central portion of said reflective surface is raised above the water surface.

7. The device in claim 6 wherein said arching means includes an
   inflatable chamber transversely positioned on one end of said raft,
   said chamber have a lower portion and an upper portion,
   said lower portion being shorter than said upper portion in an environment of low solar radiation,
   said lower portion having a heat absorbing interior surface whereby the temperature of said lower surface increases more than the temperature of said upper surface when exposed to solar energy and said lower surface expands to the length of said upper surface
   whereby said raft is arched under conditions of low solar radiation and flat under conditions of significant solar radiation.

8. The device in claim 6 wherein said arching means includes a band of high thermal coefficient of expansion material attached to the edges of said raft and below the center line thereof.

9. In a system for heating a pool of water by solar energy,
   a plurality of inflatable rafts each having a thermally transparent top surface and a bottom surface with a thermally reflective exterior floating on said water.
   means on each raft for adjusting the relationship between the bottom surface thereof and the water surface in conjunction with the amount of solar radiation,
   whereby each of said rafts lies flat in the water with the bottom surface in thermal conductive relationship therewith during periods of substanial solar radiation,
   and whereby at least a portion of said reflective surface is raised above the water into thermal reflective relationship therewith during periods of low solar radiation.

10. The device of claim 3 including pumping means for inflating said chambers during periods of reduced solar radiation and automatic time-clock means for controlling the energization of said pumping means.

* * * * *